United States Patent [19]

Pominville

[11] Patent Number: 4,637,824

[45] Date of Patent: Jan. 20, 1987

[54] PAINT DETACKIFICATION METHOD

[75] Inventor: Douglas A. Pominville, Edmond, Okla.

[73] Assignee: Atlantic Richfield Company, Los Angeles, Calif.

[21] Appl. No.: 747,499

[22] Filed: Jun. 21, 1985

[51] Int. Cl.$^4$ ............................................. B01D 47/00
[52] U.S. Cl. ........................................ 55/85; 134/38; 210/725; 210/728
[58] Field of Search ............................... 55/84, 85, 89; 98/115 SB; 252/180, 181; 210/727, 728, 725; 134/38

[56] References Cited

U.S. PATENT DOCUMENTS

| | | | |
|---|---|---|---|
| 4,002,490 | 1/1977 | Michalski | 134/38 |
| 4,067,806 | 1/1978 | Mauceri | 55/89 |
| 4,440,647 | 4/1984 | Puchalski | 55/84 |
| 4,450,092 | 5/1984 | Huang | 252/181 |

*Primary Examiner*—Bernard Nozick
*Attorney, Agent, or Firm*—Coleman R. Reap

[57] ABSTRACT

Paint spray booth wastes which have been collected in a water wash are easily detackified and removed from the wash water by adjusting the pH of the wash water to a pH of about 7.0 to 12.0 with an alkali metal silicate and contacting the paint wastes in the wash water with an amphoteric metal salt and a poly(diallyldimethylammonium halide).

12 Claims, No Drawings

PAINT DETACKIFICATION METHOD

FIELD OF THE INVENTION

This invention relates to an improved method for detackifying oversprayed paint and preventing it from accumulating on the surfaces of paint spray booths and in drain lines.

BACKGROUND OF THE INVENTION

Automatic spraying techniques have long been employed for painting large articles such as cars, trucks, refrigerators, etc., and small articles, such as vehicle and equipment parts. The items being sprayed are generally advanced along a conveyor line which passes through paint spray booths where a fine spray of paint is automatically directed at the articles being painted from paint spray guns which are located on one side of the conveyor. Oversprayed paint, i.e. paint which does not contact the article being painted, forms a fine mist of paint in the air space surrounding the painted article. This paint mist must be removed from the air. To accomplish this the contaminated air is pulled to the rear of the paint booth by air exhaust fans which are generally located behind the conveyor. A curtain of cascading water, generally having a pH above 8, is maintained across the path of the air in such a manner that the air must pass through the water curtain to reach the exhaust fans. As the air passes through the water curtain the paint mist is scrubbed from the air and carried to a sump basin, usually located below the paint spray booth (see U.S. Pat. No. 2,585,407). However the water itself does not detackify the paint and unless it is treated to detackify it, it tends to adhere to the sump and drain surfaces. To prevent clogging of the sump drain and sewer system the accumulated paint must be periodically removed from the sump. This is generally accomplished by shovelling, which is costly and time consuming. It is preferable to detackify the paint so that it will not adhere to the surfaces of the waste paint collection system and to cause the detackified paint particles to coalesce for easy removal from the system. It is very desirable to be able to thoroughly separate the waste paint solids from the water so that the water may be recycled and the paint solids properly disposed of.

Various procedures and techniques have been tried to detackify the paint. For instance, U.S. Pat. No. 3,515,575 discloses contacting the paint with inorganic substances, such as clay, starch, colloidal silica, talc, etc., to detackify it. Other U.S. Pat. Nos. which disclose the use of clays to detackify paint are 2,267,426, 4,125,476, 4,220,456, 4,380,495 and 4,504,395. Although these materials are somewhat effective for detackifying paint particles they sometimes leave a lot to be desired in the removal of detackified paint from the system.

Organic chemical substances such as polymeric flocculants have also been used to detackify paint overspray in spray booths. These systems are superior to the simple use of clays since they facilitate the coalescence and separation of the paint particles from the circulating water system. U.S. Pat. No. 4,002,490 teaches the use of a water-soluble salt of an amphoteric metal, propylene glycol and a polycationic polymer U.S. Pat. No. 3,990,986 describes the use of zinc chloride and a polyelectrolyte at pHs above 8 to detackify paint spray booth wastes. This patent also discloses the combination of a metal salt which forms an insoluble hydroxide above pH 7, a primary amino alcohol and a polyether to clarify and detackify paint spray booth wastes. U.S. Pat. No. 4,440,647 discloses the use of a water-dispersible polyamide-epichlorohydrin resin, a polymer formed from hexamethylene diamine and ethylene dichloride, and an amphoteric metal salt. This patent also describes the use of ferric chloride in combination with cationic polymers to treat suspended matter comprising water and oil-based paints. U.S. Pat. No. 4,067,806 discloses the use of blends of a terpolymer of dialkyldimethylammonium halide, N-vinyl-2-pyrrolidone and acrylamide and a water-soluble salt of an amphoteric metal, such as aluminum chloride, to reduce the tackiness of oversprayed paint and lacquer solids in paint spray booths.

OBJECTS OF THE INVENTION

The objects of the invention are to remove spray paint particles from the air, to detackify the paint particles, to prevent the paint particles from clogging up the water circulating system which is used to scrub paint particles from the air and to coalesce the detackified particles so that they may be easily and efficiently removed from the water circulating system.

SUMMARY OF THE INVENTION

The foregoing objects are achieved as follows: Waste paint particles which are captured in the water spray system of paint spraying booths are detackified and coalesced by contacting the paint particles with a three-component system comprised of a water-soluble salt of an amphoteric metal, an alkali metal silicate and a polymer of a diallyldialkylammonium halide. In preferred embodiments the amphoteric metal salt is aluminum chloride, the alkali metal silicate is sodium metasilicate and the polymer is poly (diallyldimethylammonium chloride).

DETAILED DESCRIPTION OF THE INVENTION

The water-soluble amphoteric metal salts useful in the invention are those salts which form hydroxides in water at a pH of seven or higher and which will not cause water pollution problems. Typical of the amphoteric metal salts which can be used in the invention are the water-soluble chlorides, nitrates and sulfates of magnesium, aluminum, zinc and iron (ferric ion). These salts are not the only salts that can be used but they are the most useful because of their water-solubility, low cost and innocuousness. Specific examples of suitable salts include aluminum chloride, zinc chloride, ferric chloride, zinc nitrate, aluminum nitrate, aluminum sulfate, ferric chloride, ferric sulfate, etc. The most preferred water-soluble salts are aluminum chloride, ferric chloride and zinc chloride.

For effective detackification of the paint particles it is important that the pH of the aqueous liquid in which the paint particles are collected be above 7. It is preferred that the pH be maintained in the range of about 7 to 12 and the best results are obtained when the pH is maintained in the range of about 8.0 to 11.0. The principal agent used to maintain the water pH in the above range is an alkali metal silicate. Alkali metal silicates are desirable for use as pH control agents for another reason. These compounds provide a protective coating over exposed metal surfaces, and thereby function as corrosion inhibiting agents. The preferred alkali metal silicates are the metasilicates, particularly sodium metasilicate and potassium metasilicate. Mixtures of different alkali metal silicates or mixtures of alkali metal silicates and other alkaline substances, for example sodium hydroxide, can also be employed in the invention, if desired.

The polyquaternary amine polymer used in the process of the invention is diallylalkylammonium halide homopolymer. The preferred diallyldialkylammonium halide homopolymers are poly(diallyldimethylammonium chloride) and poly(diallyldimethylammonium bromide). The most preferred polymer is poly(diallyldimethylammonium chloride), commonly referred to as poly(DADMAC).

Suitable diallyldialkylammonium halide polymers are those having average molecular weights of at least 5,000. Preferred polymers are those having minimum average molecular weights of about 10,000. There is no functional upper molecular weight limit for useable polymers. The upper molecular weight limit of the diallyldialkylammonium halide polymer is dictated by the economics of preparation. Polymers having molecular weights as high as 300,000 are useful. From an economic standpoint polymers having molecular weights up to about 200,000 are preferred.

The detackification system disclosed in this invention can be used to detackify both oil-based paints and water-based paints. It is particularly effective for detackifying oil-based high solids enamels.

The amount of basic salt added to the water wash system will vary depending upon the amount of water present, the pH of the paints being treated, the particular basic salt or salts being used and the pH at which it is desired to operate the water wash system. In general it is desirable to add sufficient basic salt to maintain the pH of the wash liquid above about 7 and preferable to add enough basic salt to maintain the pH above 8. The minimum pH will depend upon the type of paint being detackified. In general, oil-based paints require a higher pH for satisfactory detackification than do water-based paints. It is seldom desirable to raise the pH to above 12.0 and the preferred upper pH value is about 11.0.

The amount of the amphoteric metal salt and poly(diallyldialkylammonium halide) added to the system will depend upon the particular paints being detackified and the degree of clarification desired. It is usually desired to add sufficient amounts of these materials to completely detackify and coalesce the paint particles, although in some cases, lesser amounts may be preferred. The ratios of basic salt to poly(diallyldialkylammonium halide) usually desired are in the range of about 100:1 to 1:1 and preferably in the range of about 20:1 to 10:1, on a weight basis.

In a typical paint spray booth operation the water wash system is a circulating system. Water is pumped from a sump through piping to water wash units located in paint spray booths. In the wash units the water is discharged through nozzles located near the top of each spray booth to form a continuous vertical curtain as it drops into a collection sump located beneath the spray booth floor. The cascading water entraps tiny paint particles and carries them into the spray booth collection sump. Water is pumped from the collection sumps back to the main sump. The additives used in this invention can be added at any point in the system. They are generally added in concentrations sufficient to form a light floc. The paint particles contact the floc and are absorbed. Periodically the system is flushed and refilled with fresh water and chemicals. The paint-containing waste water is discharged to a waste treatment facility where the flocculated paint is removed and disposed of.

Other additives can be added to the circulating water system. For example, it may be desirable to add surfactants, defoamers or water softeners to the circulating water. Additionally, other paint detackifiers, such as clays, may be used in combination with the detackifiers of the invention.

The invention is further illustrated in the following example, in which parts and percentages are expressed on a weight basis, unless otherwise indicated.

EXAMPLE

A paint spray booth equipped with a circulating wash water system was used for painting articles with a high solids enamel paint. To detackify the oversprayed paint a treating program was applied to the booth. The treating program consisted of adding 1000 to 3000 ppm of a mixture of aluminum chloride and poly(diallyldimethylammonium chloride), sold by Chemlink, Inc. under the trademark IPC 6000, and 1000 to 3000 ppm of sodium metasilicate, sold by Chemlink, Inc. under the trademark IPC 6070. This program was so effective that it took one man only two hours to clean the detackified paint sludge from the wash water system.

When the spray booth was operated with a conventional clay and caustic treatment program the paint was not well detackified and it took five people three 8 hour shifts to remove the paint sludge from the water wash system.

This example shows that the use of the paint detackification system of the invention presents a very significant improvement over the use of a conventional paint detackifier for detackifying high solids enamels.

Although the invention has been described with particular reference to specific examples, it is understood that modifications are contemplated. For instance, the mixtures used in the invention can be used to detackify water-based paints. The scope of the invention is limited only by the breadth of the appended claims.

We claim:

1. In a process for detackifying airborne paint particles comprising removing the paint particles from the air by entrapping them in an aqueous wash stream to which has been added, in sufficient quantity to reduce the tackiness of said paint particles, a water-soluble amphoteric metal salt which hydrolyzes to an hydroxide at a pH above 7, a basic salt in sufficient quantity to adjust the pH of the aqueous wash stream to a value in the range of about 7 to 12 and a polymeric flocculating agent, the improvement comprising using as the basic salt an alkali metal silicate and as the polymeric flocculating agent a diallyldialkylammonium halide homopolymer having an average molecular weight of at least 5000.

2. The improved process of claim 1 wherein said water-soluble amphoteric metal salt is selected from aluminum chloride, ferric chloride, zinc chloride and mixtures of these.

3. The improved process of either of claims 1 or 2 wherein said basic salt is sodium metasilicate, potassium metasilicate or mixtures of these.

4. The improved process of claim 3 wherein said polymeric flocculating agent is poly(diallyldimethylammonium chloride), poly(diallyldimethylammonium bromide) or mixtures of these.

5. The improved process of claim 4 wherein the basic salt is present in the aqueous wash stream at a concentration sufficient to adjust the pH of the aqueous wash stream to a value in the range of about 8.0 to 11.0.

6. The improved process of claim 5 wherein the polymeric flocculating agent has an average molecular weight in the range of about 5,000 to 300,000.

7. The improved process of claim 5 wherein at least one additional pH adjusting agent selected from sodium hydroxide, potassium hydroxide, sodium oxide, potassium oxide and mixtures of these is added to said aqueous wash stream.

8. The improved process of claim 5 wherein the aqueous wash stream is part of a circulating system.

9. The improved process of claim 8 wherein said amphoteric metal salt is aluminum chloride, said basic salt is sodum metasilicate and said polymeric flocculating agent is poly(diallyldimethylammonium chloride).

10. The improved process of claim 9 wherein said amphoteric metal salt is aluminum chloride, said basic salt is sodium metasilicate and said polymeric flocculating agent is poly(diallyldimethylammonium chloride).

11. A process for detackifying paint spray booth wastes which have been collected in a water wash stream and clarifying the waste-containing water wash stream comprising
  (1) adding to the water wash stream
    (a) at least one metal salt selected from aluminum chloride, ferric chloride and zinc chloride,
    (b) a diallyldimethylammonium chloride homopolymer having an average molecular weight of at least 5000, and
    (c) sodium metasilicate, the ratio of components (a) and (b) added to the water wash stream being in the range of about 100:1 to 1:1 and the amount of sodium metasilicate added to the water wash stream being sufficient to maintain the pH of the water wash stream in the range of about 8.0 to 12.0, and
  (2) removing the detackified paint wastes from the water wash stream.

12. The process of claim 11 wherein the ratio of components (a) and (b) added to the water wash stream is in the range of about 20:1 to 10:1.

* * * * *